Figure 1:
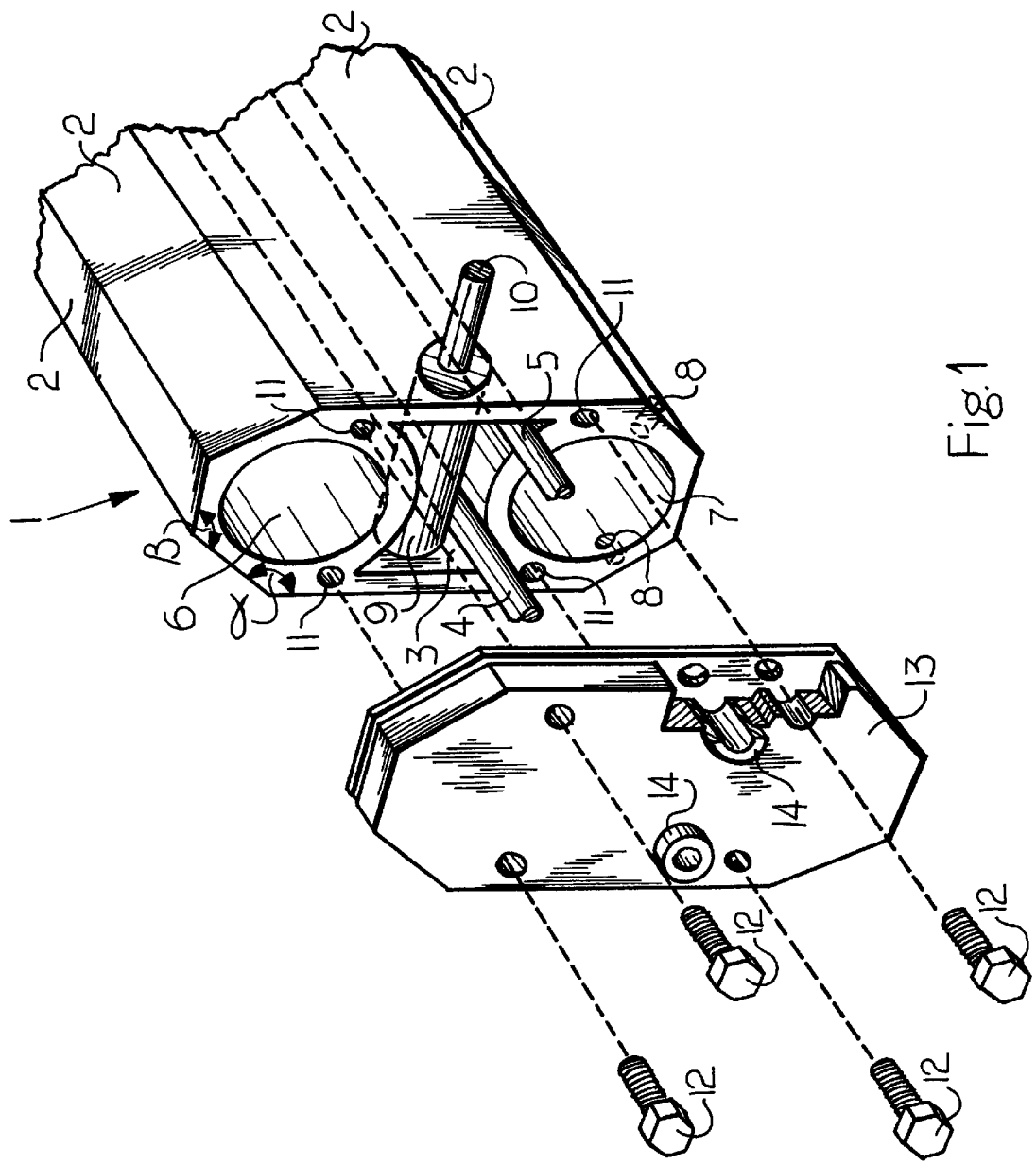

United States Patent

Beijaard et al.

[11] Patent Number: 6,039,080
[45] Date of Patent: Mar. 21, 2000

[54] MACHINE FRAME FOR THE MEAT PROCESSING INDUSTRY AND TUBE PROFILE

[75] Inventors: Barend Jacobus Emmanuel Beijaard, Oploo; Thomas Gerardus Maria Jacobs, Doetinchem; Leonardus Jozephus Antonius Tiggeloven, Groenlo, all of Netherlands

[73] Assignee: Stork R.M.S. B.V., Lichtenvoorde, Netherlands

[21] Appl. No.: 09/267,914

[22] Filed: Mar. 5, 1999

Related U.S. Application Data

[62] Division of application No. 08/721,821, Sep. 27, 1996, Pat. No. 5,878,785.

[30] Foreign Application Priority Data

Sep. 29, 1995 [NL] Netherlands ............................ 1001322

[51] Int. Cl.⁷ .................................................. F16L 9/18
[52] U.S. Cl. ......................... 138/115; 138/111; 138/177; 138/117
[58] Field of Search .................................. 138/115, 111, 138/114, 116, 117, 177, 178

[56] References Cited

U.S. PATENT DOCUMENTS

| | | |
|---|---|---|
| 2,130,498 | 9/1938 | Klemschofski et al. ............ 138/177 X |
| 2,397,655 | 4/1946 | Francis ................................ 138/177 X |
| 3,081,795 | 3/1963 | Lesser ................................ 138/177 X |
| 3,419,046 | 12/1968 | Peterson ............................. 138/177 X |
| 3,593,666 | 7/1971 | Savage ...................................... 104/89 |
| 3,648,920 | 3/1972 | Stump ................................ 138/177 X |
| 3,809,155 | 5/1974 | Anthony et al. .................... 138/177 X |
| 4,011,726 | 3/1977 | Cooper, Jr. ......................... 138/177 X |
| 4,524,698 | 6/1985 | Tourtellier et al. ................. 104/110 X |
| 4,843,971 | 7/1989 | Brauunagel ............................ 104/94 |
| 4,860,662 | 8/1989 | Matsumoto et al. ...................... 104/93 |
| 5,450,703 | 9/1995 | Fuhrman et al. ................... 138/115 X |
| 5,553,947 | 9/1996 | Scheib et al. ....................... 104/107 X |

*Primary Examiner*—Patrick Brinson
*Attorney, Agent, or Firm*—Webb Ziesenheim Logsdon Orkin & Hanson, P.C.

[57] ABSTRACT

The invention relates to a machine frame for the meat processing industry, which can be assembled at least partly from tube profile parts, which tube profile parts can be loaded and the outside of which comprises at least one guide surface for guiding machine parts.

The invention also relates to a tube profile for assembling such a machine frame. Using the machine frame and the tube profile according to the invention it is possible to assemble constructions which can be cleaned very easily.

18 Claims, 3 Drawing Sheets

MACHINE FRAME FOR THE MEAT PROCESSING INDUSTRY AND TUBE PROFILE

CROSS-REFERENCE TO RELATED APPLICATION

This application is a divisional of U.S. patent application Ser. No. 08/721,821 filed on Sep. 27, 1996, now U.S. Pat. No. 5,878,785, issued Mar. 9, 1999.

The invention relates to a machine frame for the meat processing industry. The invention also relates to a tube profile for assembling at least a part of a machine frame for the meat processing industry.

In the meat processing industry transport and processing of the basic products, semi-manufactures and end products are usually at least partly mechanized or automated. For instance in a slaughterhouse the transport of cadavers thus takes place along a guide track provided with hooks, along which guide track processing stations can optionally be arranged. Both conveyor and processing station generally comprise a frame to support the elements providing the required functionality. In the meat processing industry good hygiene is moreover of very great importance. A drawback of the devices currently used in the production environment is that they are difficult to clean and that they are moreover constructions which are very difficult to modify when there are changed requirements in respect of production or transport.

From the disclosure of German reference DE 3201402 a tubular track device for manufacture using system building is thus known and in which at least one elongate u-shaped aluminium profile part for mounting horizontally on a ceiling carries a guide tube. The legs of the u-shaped profile part are short. The upper profile part is suspended from the ceiling with interposing of mounting elements, wherein the mounting elements take a temperature insulating form. The lower profile part carries on the inside the guide tube along which hanging aluminium guide hooks are slidable.

The object of the present invention is to provide a machine frame for the meat processing industry and a tube profile for assembling such a machine frame which can be cleaned well, provides sufficient sturdiness, is easy to construct and can be applied in simple manner.

The invention provides for this purpose a machine frame for the meat processing industry, which can be assembled at least partly from tube profile parts, which tube profile parts can be loaded and the outside of which comprises at least one guide surface for guiding machine parts. In such a machine frame the load-bearing function and the guiding function are combined in one profile part. This limits the number of components required in a machine frame and is thereby relatively easier to clean than an existing machine frame. These advantages are realized particularly well when the tube frame part is self-supporting.

The tube frame parts are preferably embodied such that they comprise at least one internal channel for receiving conduits and/or cables. By arranging conduits and/or cables in the tube profile the number of external parts is further reduced. The channel can also function directly to transport a medium so that the channel wall can also function as conduit wall. This step also results in the machine frame being easier to clean. Another advantage is that the conduits and/or cables are protected, so reducing the risk of damage.

In yet another preferred embodiment a sensor is arranged in the frame for recording positions of an object located on the outside of the tube profile parts, such as for instance a part of a carcass, a trolley, a person etc. It will be apparent that with such a sensor the absence of an object on the outside of the tube profile part can likewise be detected (0-measurement). Due to the inclusion of the sensor in the profile part this element does not impede cleaning of the device either. Particularly in the case of sensors, which are usually sensitive, the aspect of protection against external influences is also of great importance.

In another preferred embodiment the tube profile part is provided with an internally arranged storage container for gas or liquid, an actuator and/or nozzle for passage of a medium. By arranging one or more of these elements in the profile part the outside of the machine frame will be simplified further. This results in the advantages already stated a number of times above.

The invention also provides a tube profile for assembling at least a part of a machine frame for the meat processing industry, wherein the tube profile has a cross section, the periphery of which is substantially defined by substantially straight sides, which sides enclose internal angles which are smaller than 290°. Understood by internal angle is the angle between two adjacent, substantially flat sides of the tube profile, as seen from the inside of the tube profile. Limiting the internal angle can prevent corners and/or grooves in which dirt can accumulate being situated on the outside of the tube profile. This advantage is already realized with an internal angle smaller than 290° but will become even more clearly apparent when this angle is smaller, for instance 230°. It is however recommended even more to further reduce this angle so that it is around 180° or even less than 180°. It thus becomes very improbable with an angle of less than 180° that dirt will accumulate on the outside of the profile part close to this angle. The substantially straight sides are also very suitable for guiding for instance a carriage or trolley.

The tube profile preferably has a cross-section, the periphery of which is substantially defined by at least six substantially straight sides. These substantially straight sides provide the possibility of providing a supporting force in different directions. Depending on the position of the object for supporting and the direction of the force to be produced, such an object can engage on one or more sides on the tube profile. This can take place for instance with interposing of protrusions, rollers, wheels, guide plates etc. Another advantage of the substantially straight sides is that they are easy to clean.

At least one channel is preferably arranged in the tube profile for the passage of conduits and/or cables. In another preferred embodiment at least one channel is arranged in the tube profile for the passage of a medium. The arrangement of conduits, cables, and/or channels in the tube profile limits the necessity of external conduits, cables, pipes, tubes, hoses etc. Limitation of these external elements makes the device in which the tube profile is incorporated easier to clean. The risk of damage to these elements is also limited. This step can also prevent products or people becoming entangled in loose-hanging cables, conduits etc.

The tube profile is in preference manufactured at least partly from extruded aluminium. Aluminium is a material which can be extruded very well, whereby relatively complex shapes can be manufactured.

The tube profile is preferably provided with an internal screw thread on at least one end face. Such an internal screw thread enables fixing or assembling of the profile to another profile, to a corner piece or enables a cover plate to be screwed to the end face of the profile.

Figure 2:
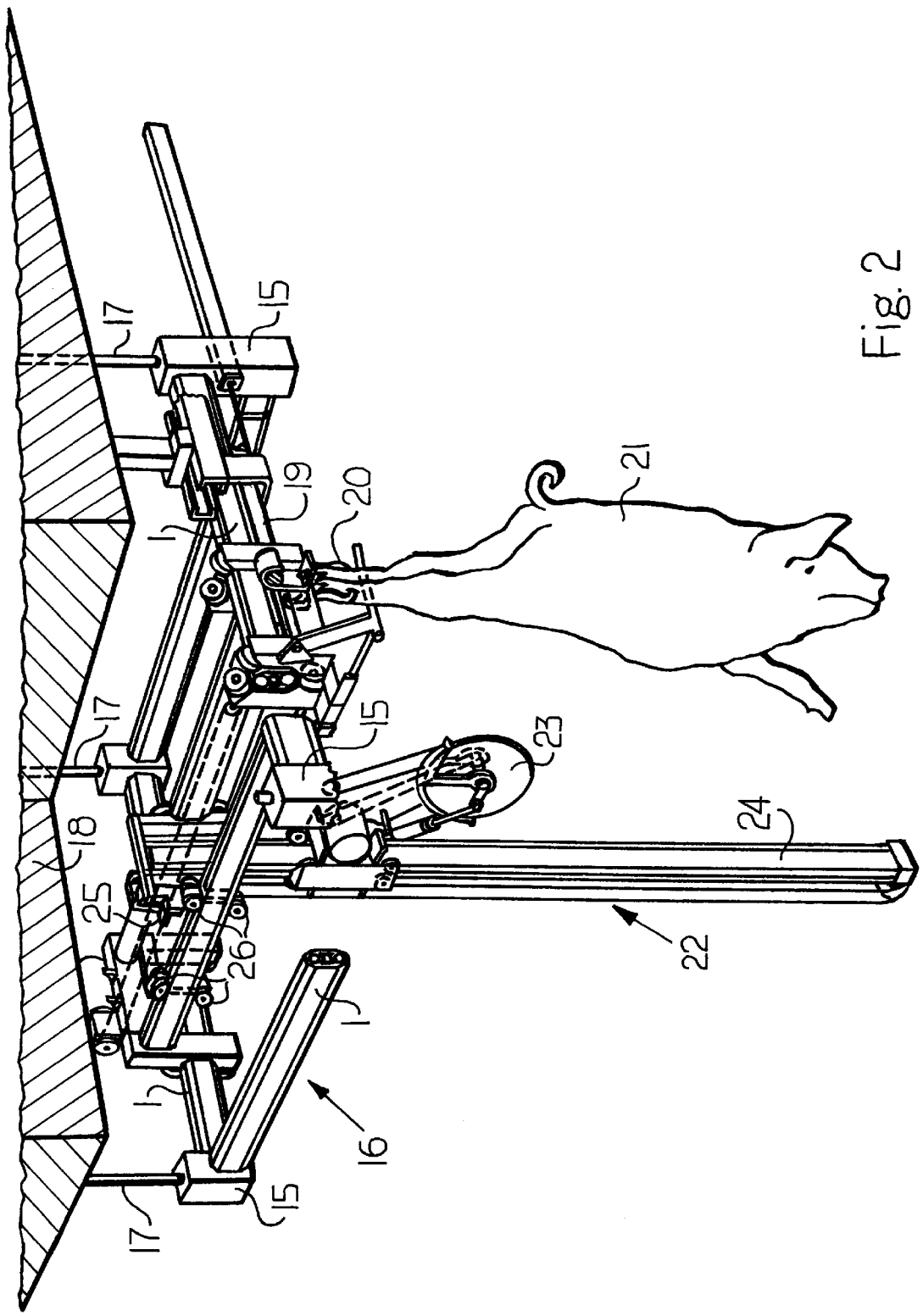
Figure 3:
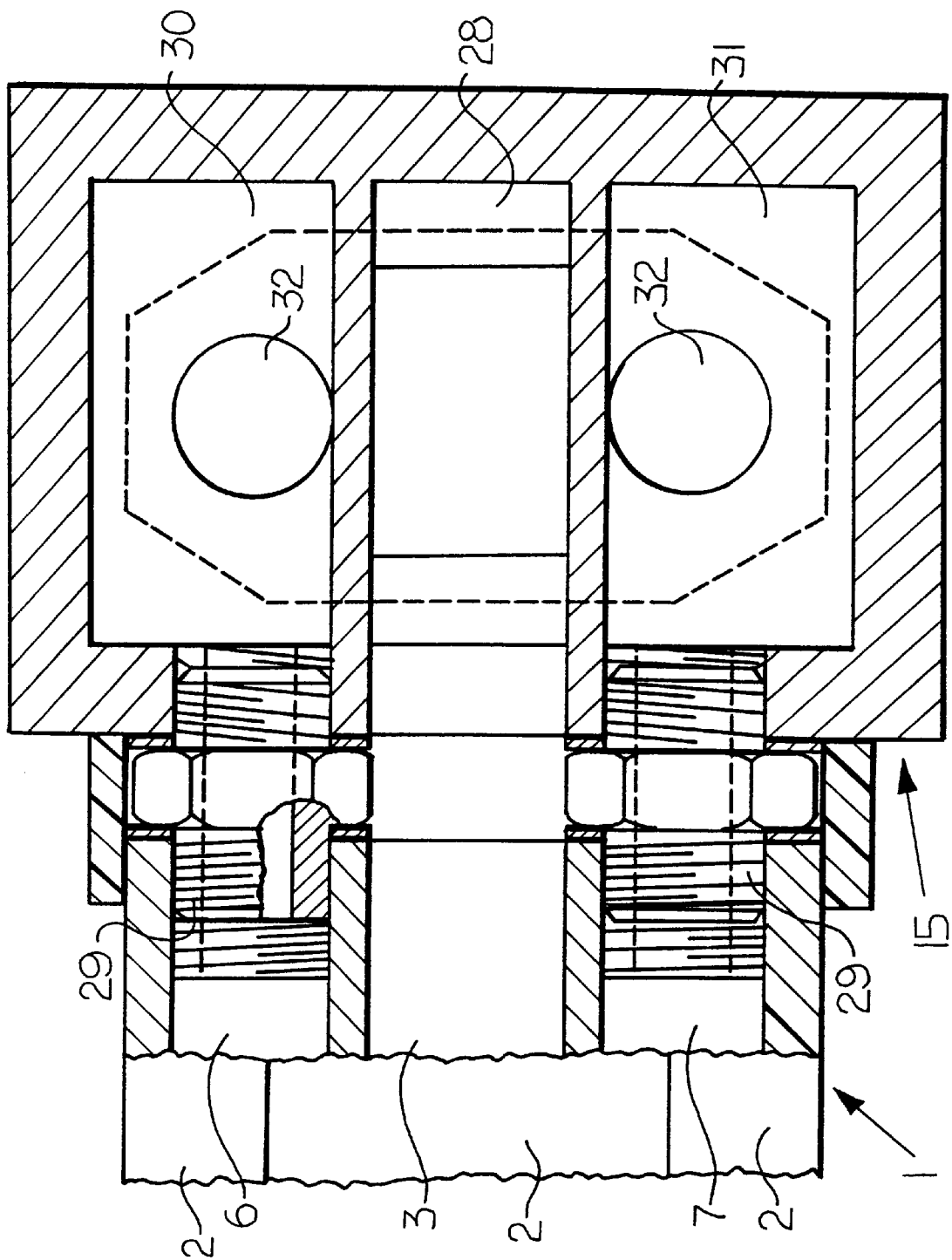

The present invention will be further elucidated with reference to the non-limitative embodiments shown in the following figures. Herein:

FIG. 1 shows a perspective view of a tube profile with cover plate according to the invention, FIG. 2 shows a perspective view of a machine frame for the meat processing industry according to the invention, and FIG. 3 shows a cross-section through a profile part according to the invention with a coupling piece fixed thereto.

FIG. 1 shows a tube profile 1 which has a cross-section of which the periphery is substantially defined by eight substantially straight sides 2. These straight sides 2 enclose internal angles alpha, beta which are smaller than 180°. The outer surface of tube profile 1 has a shape such that it is very simple to clean and contains no grooves or other recesses in which dirt can accumulate. A main channel 3 is arranged in the tube profile for passage of a conduit 4 and a cable 5. It will be apparent that sufficient space is available in the channel 3 for passage of other possible conduits or cables. The tube profile 1 further comprises two internal channels 6,7 for passage of a medium. Passage of for instance coolant or air can herein be envisaged if the tube profile 1 is situated in a warm environment. It is also possible to use one or both channels 6,7 for transport of liquid or gas to a desired position. In this figure spray nozzles 8 are thus shown with which for instance a liquid can be sprayed and/or atomized. The wall parts of the internal channels 6,7 (and also the internal wall parts of channel 3) located on the inside of tube profile 1 provide profile 1 with a greater robustness.

Further arranged in tube profile 1 is an actuator 9 for actuating a rod 10 which is accessible on the outside of tube profile 1. The actuator 9 can consist of a cylinder for causing reciprocating movement of rod 10 as well as an electric motor for causing rotation of the rod 10 depending on the required function of rod 10. On the end face of tube profile 1 are situated openings 11 with internal screw thread. By means of bolts 12 it is possible to fasten a cover plate 13 to the end face of profile 1. The bolts 12 therein co-act with the openings 11. Bushes 14 are arranged in cover plate 13 for passage of conduit 4 and cable 5.

FIG. 2 shows a machine frame for the meat processing industry which is partly assembled from tube profile parts 1 the same as tube profile 1 shown in FIG. 1. In co-action with connecting pieces 15 the tube profile parts 1 herein form a frame 16 which is suspended from a ceiling 18 with interposing of rods 17. By means of an already existing transport system 19 cadavers 21 suspended from hooks 20 are carried along a machine 22 of which the frame 16 forms part. It can be seen clearly in this figure that tube profiles 1 are utilized to support machine parts such as for instance a rotatable knife 23. In addition to the supporting function of the machine parts, it is likewise visible that tube profiles 1 are used for guiding machine parts. It can thus be seen for instance that a vertical profile part 24 carrying the rotatable knife 23 is fixed to a carriage 25 which is guidably supported on a horizontal profile part 27 with interposing of rollers 26.

Finally, FIG. 3 shows a connecting piece 15 for fixing to a tube profile 1 as shown in the foregoing figures. Hollow coupling elements 29 are placed in the channels 6,7 for transport of a medium, which coupling elements 29 are provided with two-sided screw thread. If a channel 6,7 is not used for medium transport the coupling element 29 can be embodied without internal opening. The coupling elements 29 connect unto the connecting piece 15 in which separate channels 30,31 respectively connect unto the channels 6,7 for the transport of a medium. In this manner a medium-tight coupling can be effected between respectively channels 6 and 30 and channels 7 and 31. Arranged in an end face of connecting piece 15 are openings 32 which are connectable to a profile other than profile 1 in the same manner as shown here. A channel 28 forming part of connecting piece 15 also connects onto the channel 3 for passage of conduits or cables (not shown). The connection between channels 3 and 28 does not however have to be medium-tight or can at least meet less stringent requirements than the above described couplings of channels. In FIG. 2 the connecting piece 15 shown here is connected to the ceiling in a number of cases by means of a rod 17. This is not essential, however.

It is claimed:

1. A tube profile part for assembling at least a part of a machine frame for the meat processing industry, wherein the tube profile part has a cross-section, the periphery of which is substantially defined by substantially straight sides, which sides enclose internal angles which are smaller than 290°, and wherein the tube profile part is provided on at least one end face with an internal screw thread.

2. The tube profile as claimed in claim 1, wherein the tube profile has a cross-section, the periphery of which is substantially defined by at least six substantially straight sides.

3. The tube profile as claimed in claim 1, wherein at least one channel is arranged in the tube profile for passage of conduits and/or cables.

4. The tube profile as claimed in claim 1, wherein at least one channel is arranged in the tube profile for passage of a medium.

5. The tube profile as claimed in claim 1, wherein the tube profile is manufactured at least partly from extruded aluminium.

6. A tube profile part for assembling at least a part of a machine frame for the meat processing industry, comprising:

at least six substantially straight sides defining a main channel for passage of conduits or cables, with adjacent sides enclosing an internal angle of less than about 290°;

at least one internal channel defined in said main channel for the passage of a fluid; and at least one guide surface defined on an outside of said tube profile part for guiding a machine part.

7. The tube profile part as claimed in claim 6, including an actuator extending into said main channel, said actuator comprising a cylinder with an extensible rod, said rod configured to extend outwardly from a side of said tube profile part.

8. The tube profile part as claimed in claim 6, including a nozzle in fluid communication with said internal channel.

9. The tube profile part as claimed in claim 6, including opposed end faces, with each end face having at least one threaded opening.

10. The tube profile part as claimed in claim 6, wherein said tube profile part is at least partly aluminum.

11. The tube profile part as claimed in claim 6, including opposed ends, with a connecting piece attached to at least one end of said tube profile part.

12. The tube profile part as claimed in claim 9, including a cover plate removably attached to one of said end faces by faceting means configured to engage said threaded opening.

13. The tube profile part as claimed in claim 11, wherein said connecting piece includes at least one hollow coupling element in flow communication with said at least one internal channel.

14. The tube profile part as claimed in claim 11, wherein said connecting piece includes a channel in flow communication with said main channel of said tube profile part.

15. The tube profile part as claimed in claim 11, wherein said connecting piece includes at least one opening in flow communication with another tube profile part.

16. The tube profile part as claimed in claim 13, wherein said connecting piece includes a channel in flow communication with said hollow coupling element.

17. A hollow tube profile part made at least partly from extruded aluminum for assembling at least a portion of a machine frame for the meat processing industry, wherein the tube profile part has a cross-section, the periphery of which is substantially defined by at least six substantially straight sides, which sides enclose internal angles which are smaller than about 290°,
    wherein at least one channel is arranged in the tube profile part for passage of conduits or cables or a medium, and
    wherein at least one end face of the tube profile part includes means for assembling the tube profile part with another tube profile part.

18. The tube profile part as claimed in claim 17, wherein the assembling means includes an internal screw thread.

\* \* \* \* \*